United States Patent
Asai et al.

(10) Patent No.: US 7,522,374 B2
(45) Date of Patent: Apr. 21, 2009

(54) TAPE CASSETTE RECORDING/REPRODUCING APPARATUS

(75) Inventors: Hirofumi Asai, Atsugi (JP); Kazuhide Murase, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 391 days.

(21) Appl. No.: 11/316,644

(22) Filed: Dec. 21, 2005

(65) Prior Publication Data

US 2006/0198043 A1  Sep. 7, 2006

(30) Foreign Application Priority Data

Mar. 4, 2005  (JP)  ............................. 2005-061526

(51) Int. Cl.
*G11B 15/00* (2006.01)
(52) U.S. Cl. ..................................................... 360/96.5
(58) Field of Classification Search ....................... None
See application file for complete search history.

(56) References Cited

U.S. PATENT DOCUMENTS

| | | | | |
|---|---|---|---|---|
| 4,935,895 A | * | 6/1990 | Ohyama | 360/96.51 |
| 5,008,766 A | * | 4/1991 | Chigasaki | 360/96.51 |
| 5,196,972 A | * | 3/1993 | Matsumaru et al. | 360/94 |
| 6,185,064 B1 | * | 2/2001 | Nakanishi et al. | 360/96.3 |

FOREIGN PATENT DOCUMENTS

JP  2001 52396  2/2001

* cited by examiner

*Primary Examiner*—Mark Blouin
(74) *Attorney, Agent, or Firm*—Ladas & Parry LLP (57) ABSTRACT

A tape cassette recording/reproducing apparatus in which a long length ejection for ejecting a tape cassette by a longer distance than usual is stably executed is disclosed. The tape cassette recording/reproducing apparatus includes a tape cassette housing moving mechanism that moves a tape cassette housing to an ejecting position by rotating a rotating arm, and a tape cassette pushing out mechanism that pushes out a tape cassette by a predetermined distance from the tape cassette housing positioned at the ejecting position. The tape cassette pushing out mechanism is moved by an excessive rotation of the rotating arm.

3 Claims, 14 Drawing Sheets

TAPE CASSETTE RECORDING/REPRODUCING APPARATUS

BACKGROUND OF THE INVENTION

1. Field of the Invention

The present invention relates to a tape cassette recording/reproducing apparatus; and in particular, a tape cassette streamer into/from which a tape cassette is loaded/ejected.

2. Description of the Related Art

As an external memory for a computer, there is a tape cassette streamer using a tape cassette in which a rotary drum and a tape cassette loading mechanism are provided, similar to those for a VTR (video tape recorder). Generally, the tape cassette streamer provides a tape cassette holder moving mechanism that moves a tape cassette holder in which a tape cassette is inserted between a tape cassette ejecting position and a tape cassette loading position. The tape cassette streamer has a structure for causing the tape cassette to protrude, for example, 6 mm from the front panel of the tape cassette streamer at the tape cassette ejecting position.

[Patent Document 1] Japanese Laid-Open Patent Application No. 2001-52396

Recently, in order to improve the operability of the tape cassette streamer, and in particular, in order that a physically handicapped person can easily pull out the ejected tape cassette by holding a protruding part of the tape cassette, it is required that the distance of the protruding part of the tape cassette from the front panel of the tape cassette streamer be, for example, 14 mm.

However, since the dimensions of the tape cassette streamer have been decided, it is difficult for the pulling out distance of the tape cassette from the front panel of the tape cassette streamer to be, for example, 14 mm, at the tape cassette ejecting position even when the tape cassette holder moving mechanism is designed again.

In order to meet the above requirement, there is a tape cassette streamer in which a tape cassette pushing out mechanism is added to an existing tape cassette holder moving mechanism.

The tape cassette pushing out mechanism of this tape cassette streamer includes a tape cassette pushing out lever, a spring member, a rack, and an oil damper gear. When the tape cassette holder moving mechanism is moved to the end position, a latch is undone, the tape cassette pushing out lever is slowly rotated by rotating the oil damper gear with the spring force of the spring member, and the tape cassette is pushed out from a tape cassette holder. The oil damper gear gives a braking force to the rotating tape cassette pushing out lever and makes the rotation slow, so that the tape cassette is pushed out slowly from the tape cassette holder.

However, the characteristics of the oil damper gear depend on temperature because of the use of oil; therefore, in some cases, the tape cassette is strongly pushed out and excessively protruded from the tape cassette holder. There may be a risk of the tape cassette being dropped. That is, the operation may be unstable.

In addition, the cost of the oil damper gear is relatively high; consequently, the manufacturing cost of the tape cassette streamer becomes high.

SUMMARY OF THE INVENTION

The present invention may provide a tape cassette recording/reproducing apparatus that solves the above problem.

According to the present invention, there is provided a tape cassette recording/reproducing apparatus. The tape cassette recording/reproducing apparatus includes a tape cassette holder that holds an inserted tape cassette, a tape cassette holder moving mechanism that moves the tape cassette holder in which the tape cassette is inserted between a tape cassette loading position and a tape cassette ejecting position, and a tape cassette pushing out mechanism that further pushes out the tape cassette by a predetermined distance from the tape cassette holder positioned at the tape cassette ejecting position. The tape cassette holder moving mechanism comprises a motor, an arm which is rotated by the motor, and a sliding cam which is moved by a rotation of the arm. The tape cassette holder is moved from the tape cassette loading position to the tape cassette ejecting position by a movement of the sliding cam to a predetermined position; the arm is excessively moved after the sliding cam is moved to the predetermined position; the tape cassette pushing out mechanism is disposed on the sliding cam and is moved by the excessive rotation of the arm.

According to the present invention, the tape cassette in the tape cassette holder at the tape cassette ejecting position can be stably pushed out by a predetermined distance from the tape cassette recording/reproducing apparatus with a designed speed without being influenced by outside temperature.

Other objects and further features of the present invention will become apparent from the following detailed description when read in conjunction with the accompanying drawings.

DETAILED DESCRIPTION OF THE PREFERRED EMBODIMENT

Referring now to the drawings, an embodiment of the present invention is explained.

The embodiment is explained in the following order.
1. Outline of Tape Cassette Streamer 20
2. Outline of Tape Cassette Housing Moving Mechanism 40
3. Outline of Tape Cassette Long Length Ejecting Operations
4. Structure of Tape Cassette Pushing Out Mechanism 60
5. Operations of Tape Cassette Pushing Out Mechanism 60

1 [Outline of Tape Cassette Streamer 20]

Figures 1A, 1B:
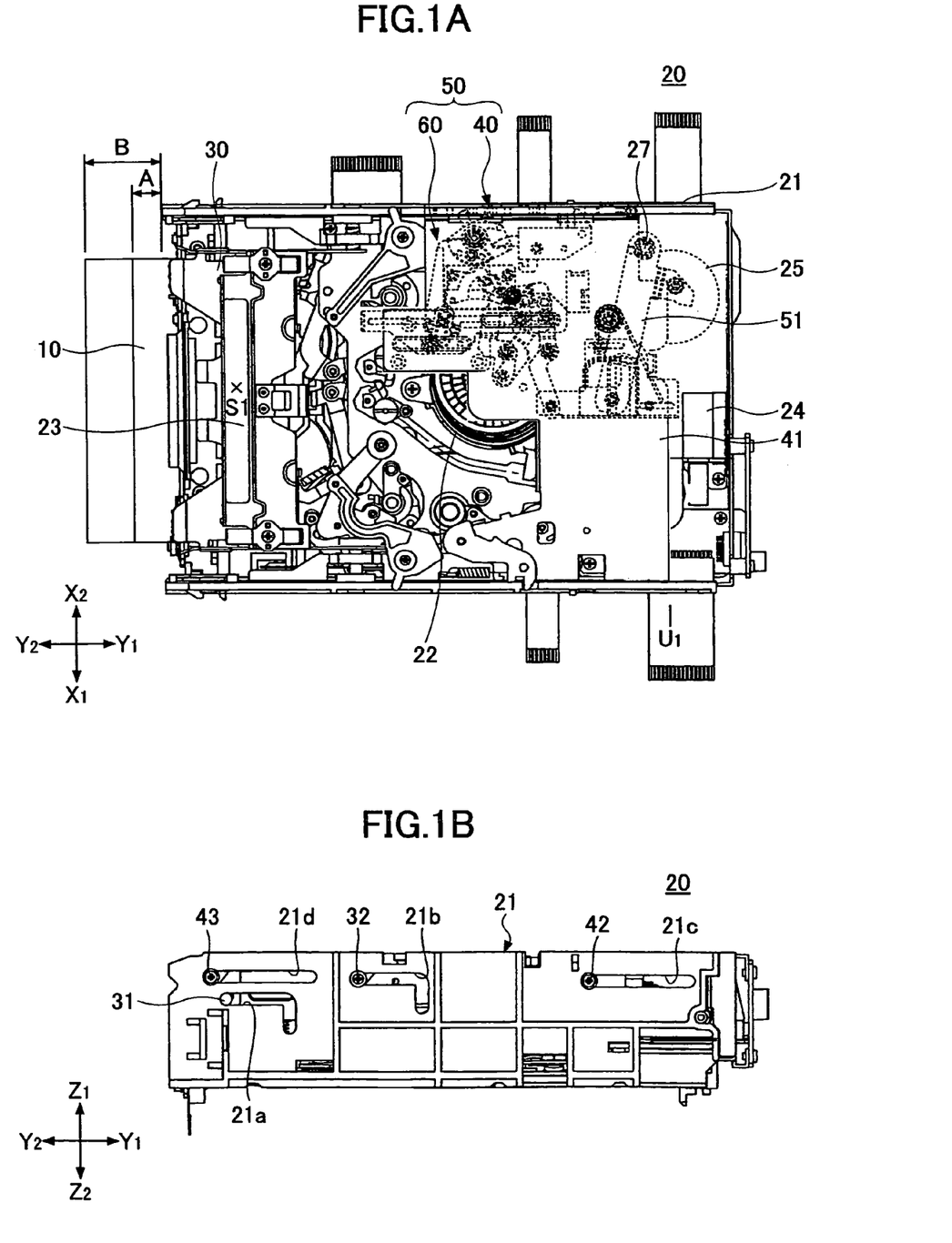
FIG. 1A is a plan view of a tape cassette streamer according to an embodiment of the present invention.
FIG. 1B is a side view of the tape cassette streamer according to the embodiment of the present invention.
Figure 2:
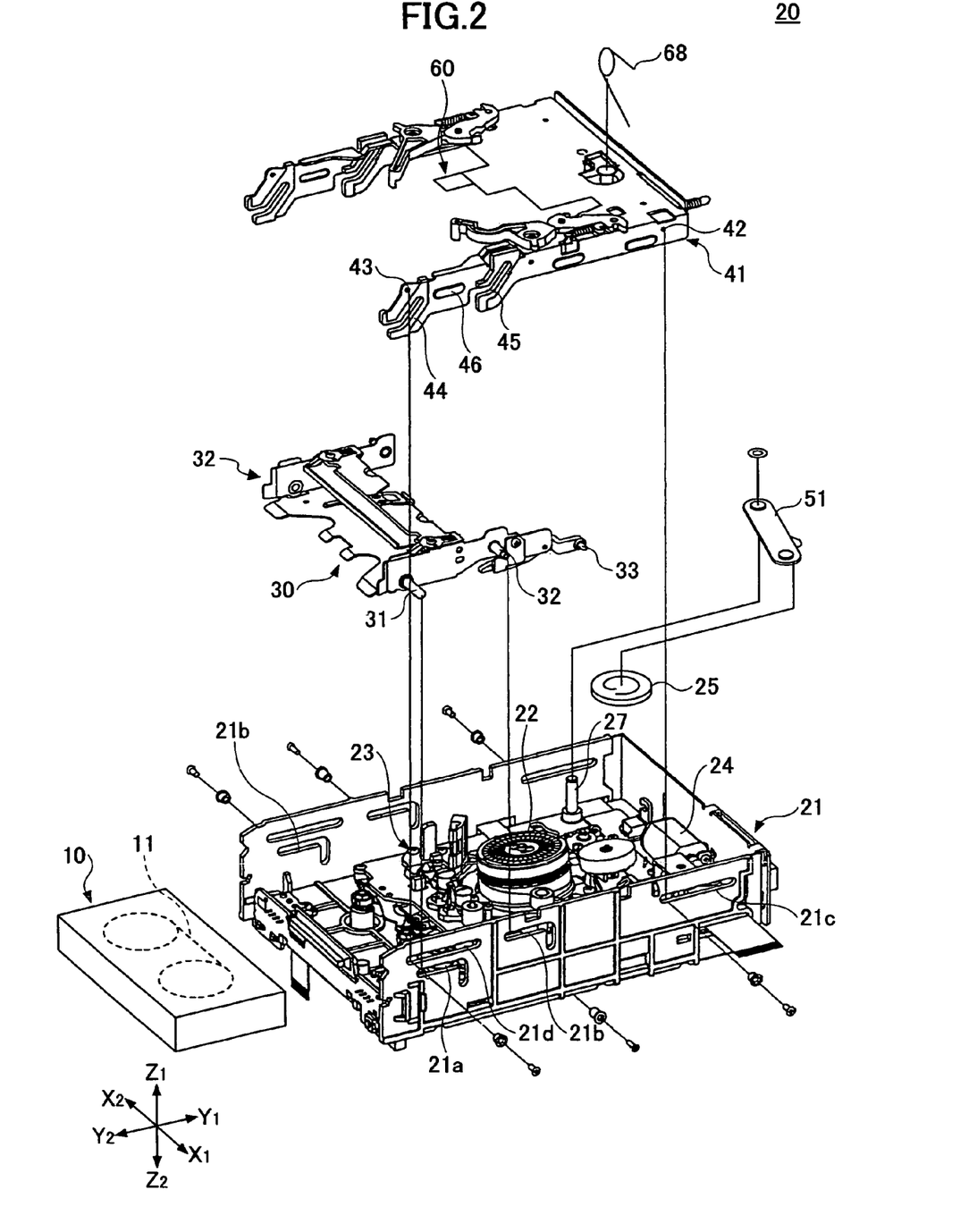
FIG. 2 is an exploded perspective view of the tape cassette streamer shown in FIGS. 1A and 1B.

FIG. 1A is a plan view of a tape cassette streamer 20 according to an embodiment of the present invention. FIG. 1B is a side view of the tape cassette streamer 20 according to the embodiment of the present invention. FIG. 2 is an exploded perspective view of the tape cassette streamer 20 shown in FIGS. 1A and 1B. In the drawings, a line X1-X2 indicates the width direction, a line Y1-Y2 indicates the length direction, and a line Z1-Z2 indicates the height direction. In FIGS. 1A and 1B, the tape cassette streamer 20 is stopped.

As shown in FIGS. 1A, 1B, and 2, in the tape cassette streamer 20, a rotary drum 22, a tape loading mechanism 23, a motor 24, a disk cam 25, and so on are assembled in a chassis 21 having an approximately box shape. In the chassis 21, a tape cassette housing 30, a sliding cam 41, and so on are assembled. The tape cassette streamer 20 further includes a tape cassette long length ejecting mechanism 50. The tape cassette long length ejecting mechanism 50 causes a tape cassette 10 to protrude from the tape cassette streamer 20 by a greater distance than the distance in a conventional streamer, and is composed of a tape cassette housing moving mechanism 40 and a tape cassette pushing out mechanism 60.

The tape cassette housing 30 is supported by engaging pins 31 and 32 in respective L-shaped grooves 21a and 21b of the chassis 21, and can be moved along the L-shaped grooves 21a and 21b.

The sliding cam 41 has an approximate U-shape looking from above, and is supported by both side pins 42 and 43 respectively engaging in grooves 21c and 21d of the chassis 21. Slanting grooves 44 and 45 of the sliding cam 41 are engaged by pins 31 and 32, respectively. The sliding cam 41 can be moved in the range of the grooves 21c and 21d in the Y1-Y2 directions. The tape cassette pushing out mechanism 60 is disposed on the lower face of the sliding cam 41.

When the tape cassette 10 is loaded (supported) in the tape cassette housing 30, a magnetic tape 11 is pulled out from the tape cassette 10 by the tape loading mechanism 23, and the magnetic tape 11 is wound on the rotary drum 22 and is loaded in a predetermined tape path of the rotary drum 22. Next, the magnetic tape 11 is run along the predetermined tape path and a rotary head in the rotary drum 22 helically scans the magnetic tape 11 and information is recorded (written) on the magnetic tape 11; further, information recorded on the magnetic tape 11 is reproduced (read). When recording/reproducing information on/from the magnetic tape 11 is finished, the tape loading mechanism 23 operates inversely, the magnetic tape 11 wound on the rotary drum 22 is returned to the tape cassette 10, and the tape cassette 10 is ejected to protrude by a long distance.

2 [Outline of Tape Cassette Housing Moving Mechanism 40]

Figure 3:
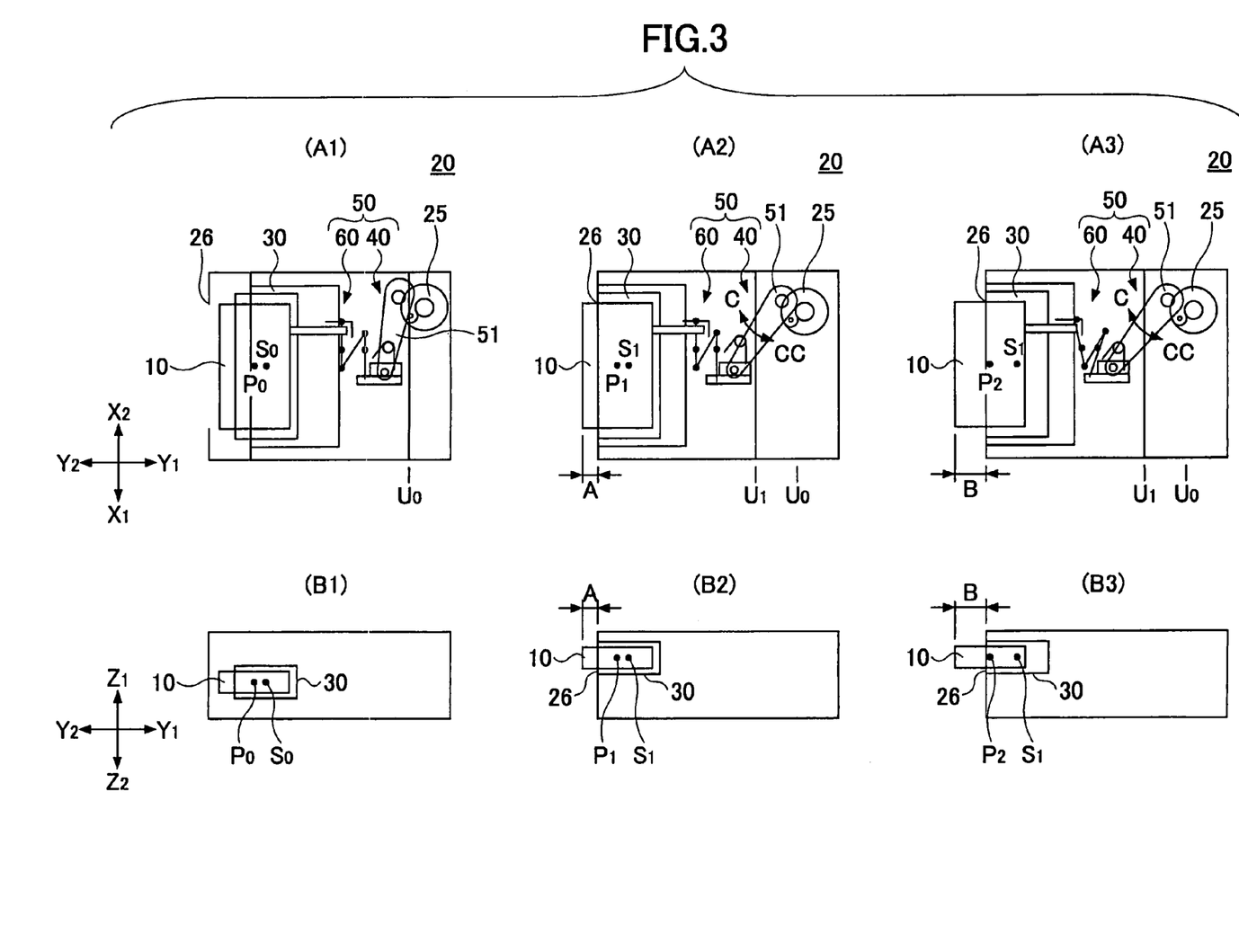
FIG. 3 is a diagram showing an outline of tape cassette long length ejecting operations.

FIG. 3 is a diagram showing an outline of tape cassette long length ejecting operations. As shown in FIGS. 1A, 1B, 2, and 3, the tape cassette housing moving mechanism 40 includes the motor 24, the disk cam 25, a rotating arm 51, and the sliding cam 41. The sliding cam 41 is connected to the tape cassette housing 30 by engaging a pin 33 of the tape cassette housing 30 in a slit 46 of the sliding cam 41. The sliding cam 41 can be slid between a loading position $U_0$ and an ejecting position $U_1$ (refer to FIG. 3). The tape cassette housing 30 can be moved between a loading position $S_0$ and an ejecting position $S_1$ (refer to FIG. 3).

When the motor 24 is driven by an ejecting instruction, the disk cam 25 is rotated, and the rotating arm 51 is rotated in the C direction by a snail groove of the disk cam 25. Further, the sliding cam 41 is moved in the Y2 direction and reaches the ejecting position $U_1$ shown in FIG. 3(A2). During the movement of the sliding cam 41, the pins 31 and 32 are moved along the L-shaped grooves 21a and 21b by the slanting grooves 44 and 45 respectively; the tape cassette housing 30 is first moved in the Z1 direction, subsequently in the Y2 direction, and to the ejecting position $S_1$ shown in FIGS. 3(A2) and (B2).

In the state shown in FIGS. 3(A2) and (B2), when the motor 24 is inversely driven, the rotating arm 51 is rotated in the CC direction, and the sliding cam 41 is moved to the loading position $U_0$ in the Y1 direction. The tape cassette housing 30 is moved in the Y1 direction and the Z2 direction by being pulled by the sliding cam 41, and consequently is moved to the loading position $S_0$ shown in FIGS. 3(A1) and (B1).

3 [Outline of Tape Cassette Long Length Ejecting Operations]

The tape cassette long length ejecting operations are executed by first operating the tape cassette housing moving mechanism 40 and subsequently operating the tape cassette pushing out mechanism 60.

FIGS. 3(A1) and (B1) show a state in which the tape cassette 10 is loaded, the sliding cam 41 is at the loading position $U_0$, the tape cassette 10 is positioned at $P_0$, and the tape cassette housing 30 is at the loading position $S_0$. The tape cassette streamer 20 is in a recording/reproducing (information writing/reading) mode. The motor 24 is driven by an ejecting instruction, the tape cassette housing moving mechanism 40 is operated, and the tape cassette housing 30 is moved to an ejecting position $S_1$ shown in FIGS. 3(A2) and (B2). The tape cassette 10 is moved to a position $P_1$ with the tape cassette housing 30, and the rear part of the tape cassette 10 is protruded from an inserting opening 26 by the distance A (approximately 6 mm). The rotating arm 51 is excessively rotated (exceeding the previous rotation) in the C direction by deflecting a twisted coil spring 68 (described later) by the snail groove of the disk cam 25. The tape cassette pushing out mechanism 60 is operated by the excessive rotation of the rotating arm 51, and as shown in FIGS. 3(A3) and (B3), the tape cassette 10 is pushed out in the Y2 direction from the tape cassette housing 30, so that the tape cassette 10 is moved to a position $P_2$ and the rear part of the tape cassette 10 is protruded by the distance B (approximately 14 mm) from the inserting opening 26. With these operations, the tape cassette long length ejecting operations are finished. The operations in which the tape cassette 10 is pushed out from the tape cassette housing 30 are stably executed at a predetermined speed without being influenced by outside temperature. In this, the sliding cam 41 stays at the ejecting position $U_1$, and the tape cassette housing 30 stays at the position $S_1$. After this, the motor 24 is inversely rotated, and the rotating arm 51 is rotated in the CC direction and is returned by the excessive rotation.

4 [Structure of Tape Cassette Pushing Out Mechanism 60]

The tape cassette pushing out mechanism 60 is disposed on the Z2 side face of the sliding cam 41. Therefore, in the following, the sliding cam 41 is shown in the upside down direction in the tape cassette pushing out mechanism 60. The rotating direction of each component is the direction shown from the Z2 side, except the rotating arm 51.

Figure 4:
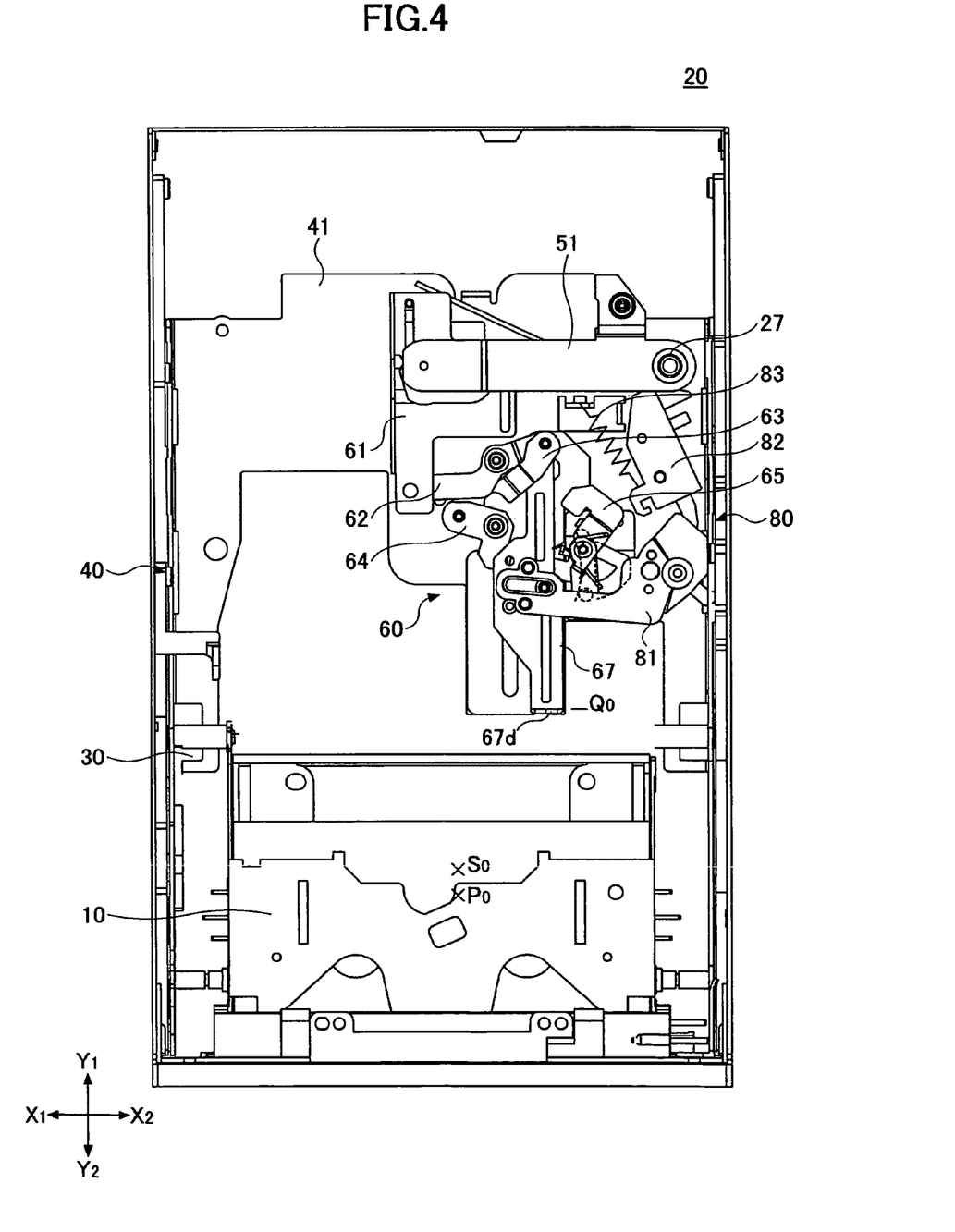
FIG. 4 is a view of the tape cassette streamer viewed from the back side thereof in which a tape cassette is loaded.
Figure 5:
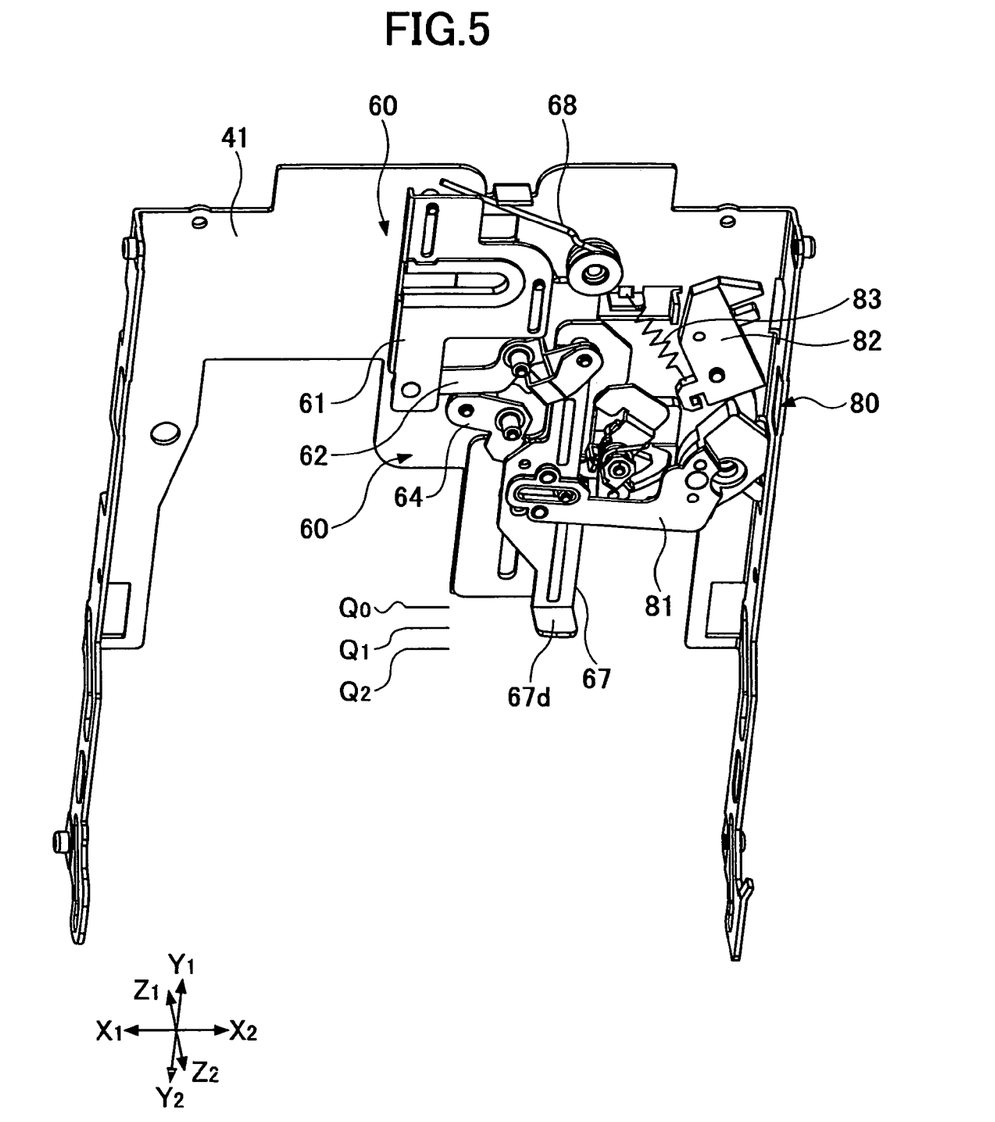
FIG. 5 is a perspective view of a tape cassette pushing out mechanism and a sliding cam locking mechanism shown in FIG. 4.
Figure 6:
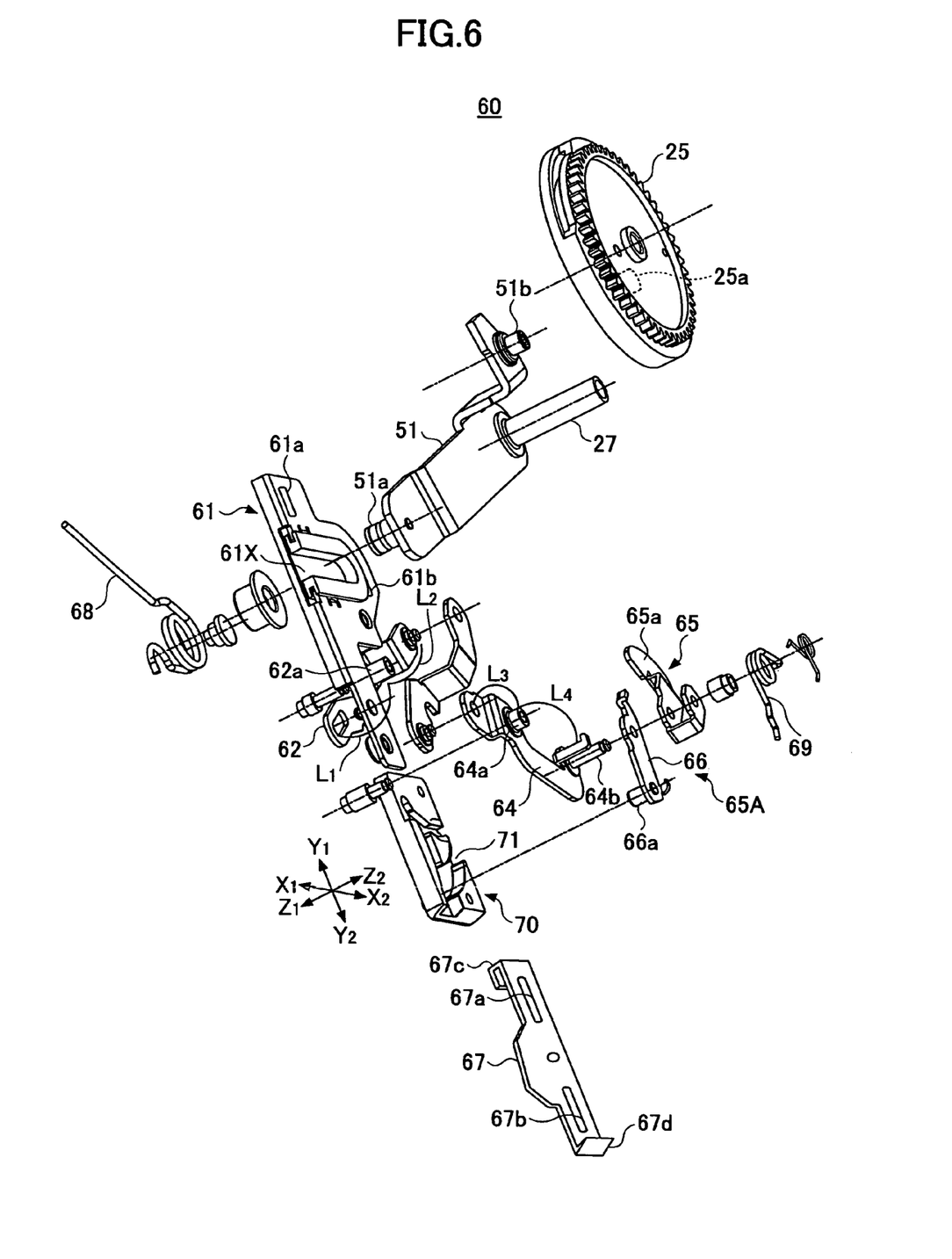
FIG. 6 is an exploded perspective view of the tape cassette pushing out mechanism shown in FIG. 4.
Figure 7:
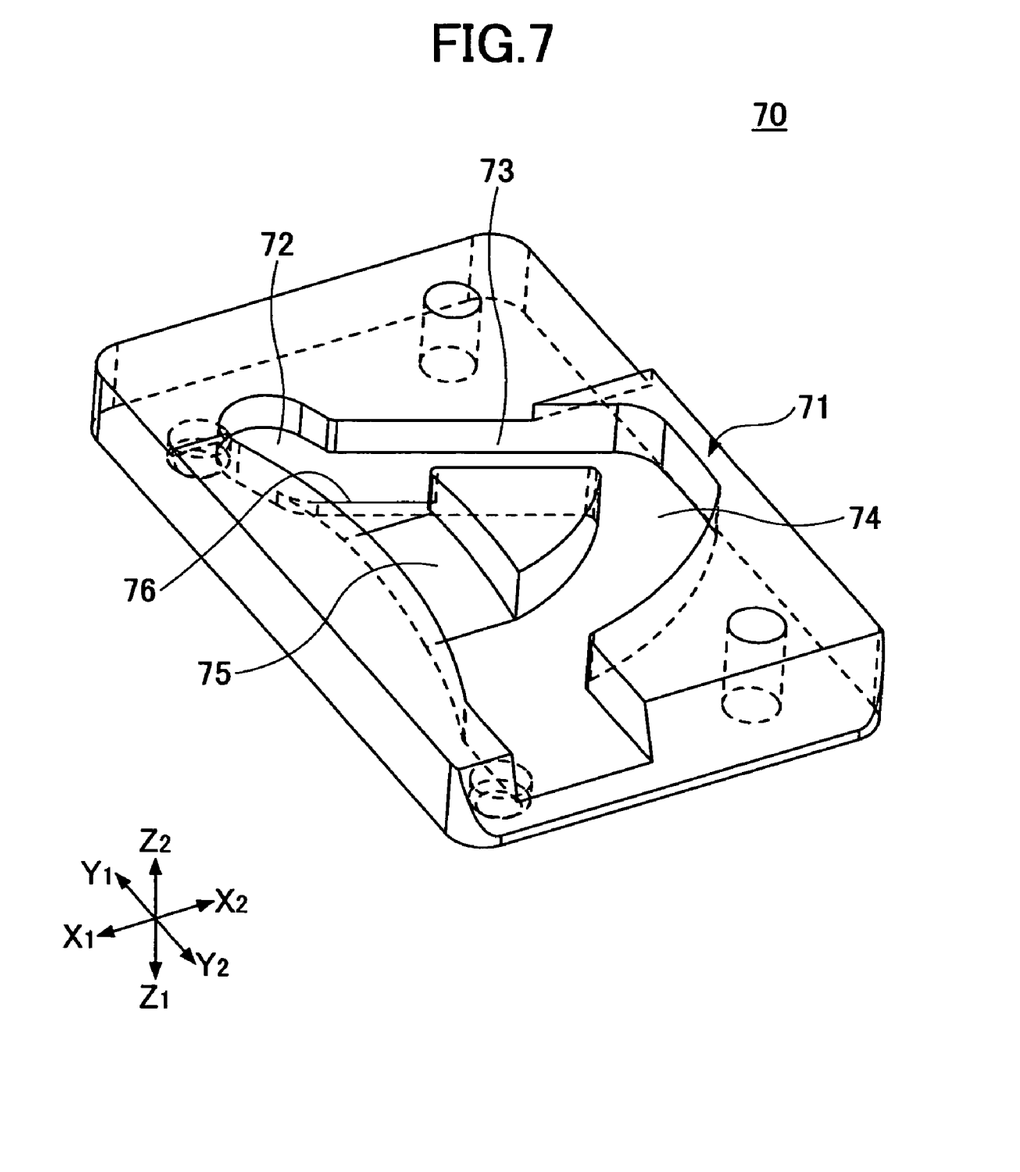
FIG. 7 is a perspective view of a one-way cam shown in FIG. 6.
Figure 8:
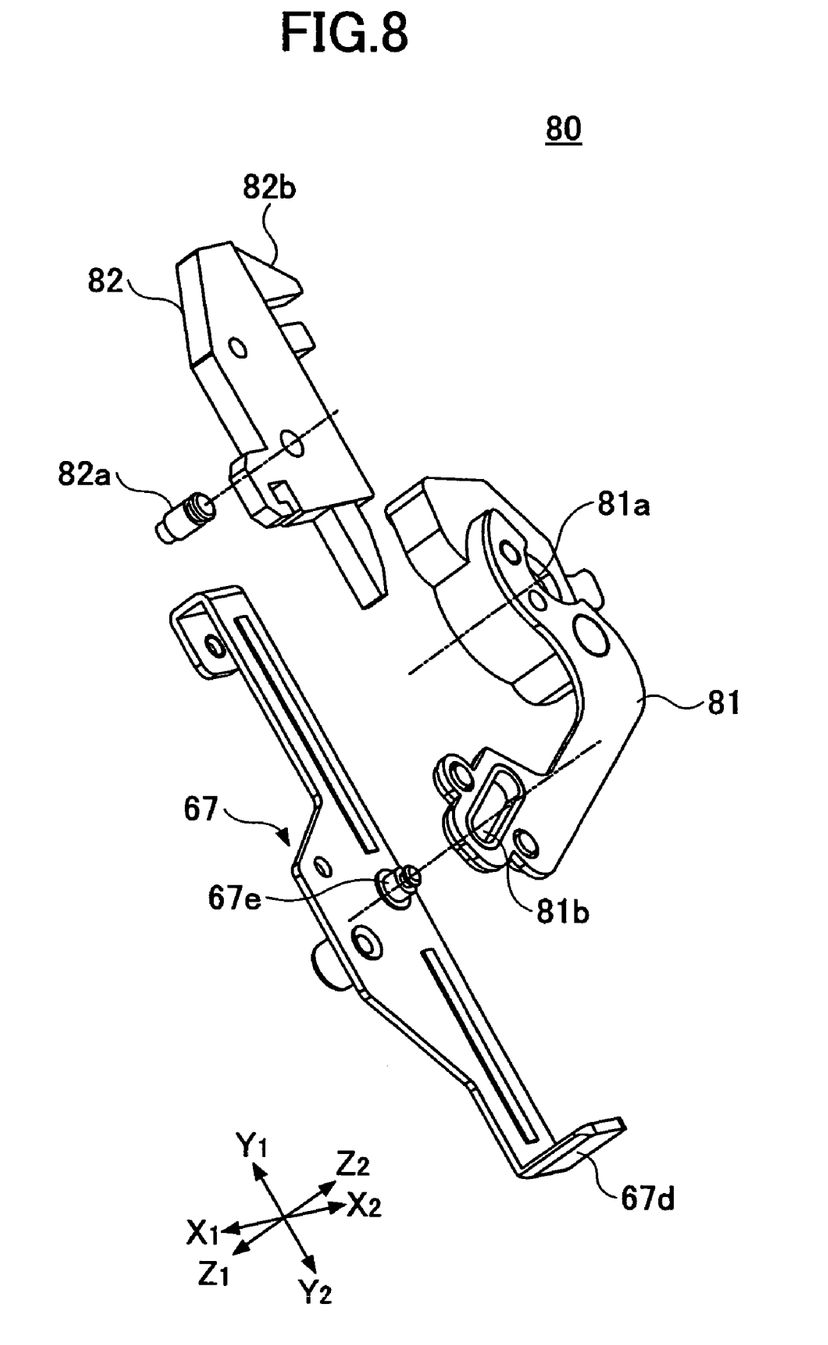
FIG. 8 is an exploded perspective view of the sliding cam locking mechanism shown in FIG. 5.
Figure 9:
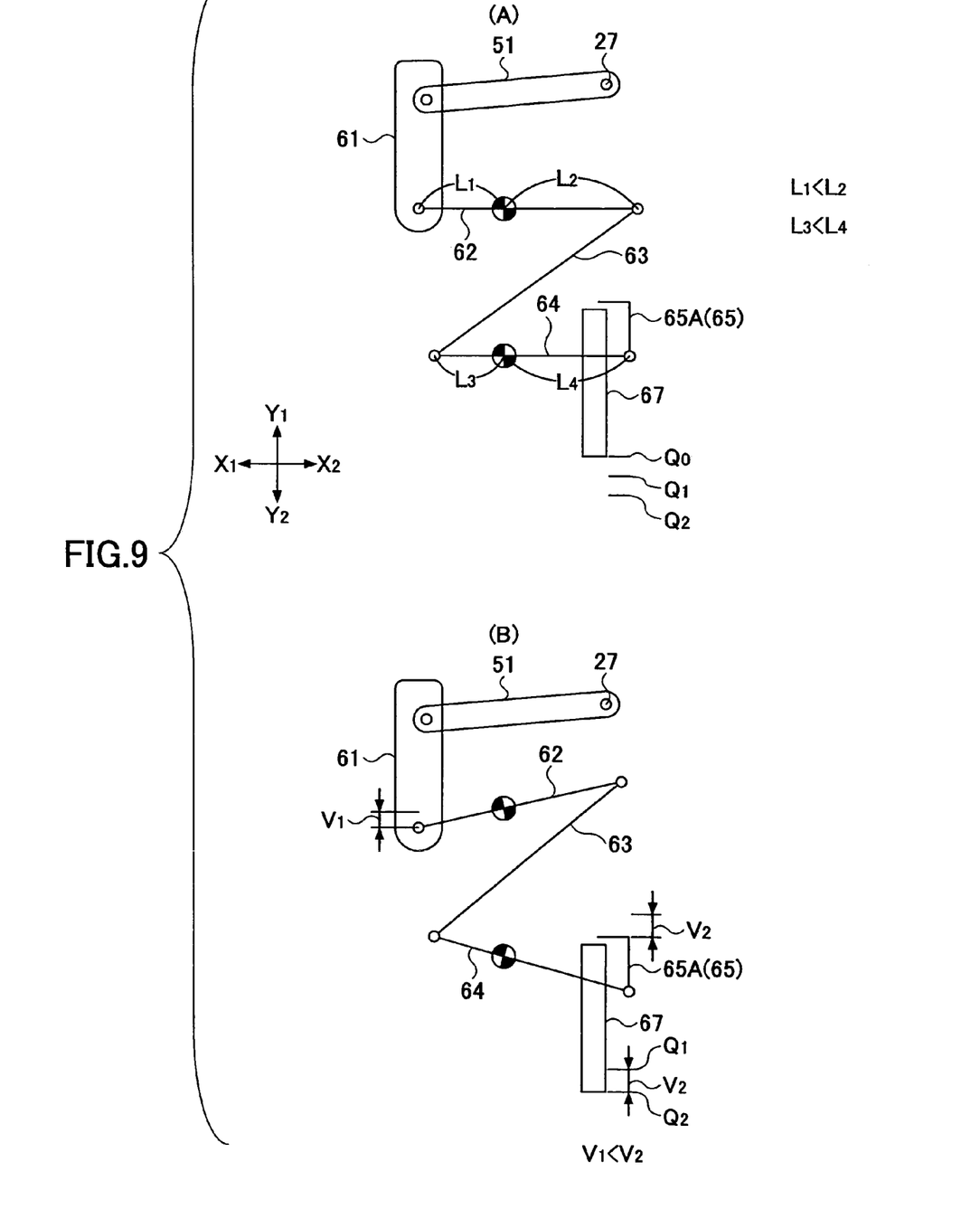
FIG. 9 is a skeleton (linkage) diagram of the tape cassette pushing out mechanism shown in FIG. 5.

FIG. 4 is a view of the tape cassette streamer 20 viewed from the back side thereof in which the tape cassette 10 is loaded. FIG. 5 is a perspective view of the tape cassette pushing out mechanism 60 and a sliding cam locking mechanism 80 shown in FIG. 4. FIG. 6 is an exploded perspective view of the tape cassette pushing out mechanism 60 shown in FIG. 4. FIG. 7 is a perspective view of a one-way cam 70 shown in FIG. 6. FIG. 8 is an exploded perspective view of the sliding cam locking mechanism 80 shown in FIG. 5. FIG. 9 is a skeleton (linkage) diagram of the tape cassette pushing out mechanism 60 shown in FIG. 5. In FIGS. 4 and 5, the tape cassette 10 is loaded in the tape cassette streamer 20, as shown in FIGS. 3(A1) and (B1). In FIG. 5, the tape cassette pushing out mechanism 60 is shown viewed from the lower face of the sliding cam 41.

As shown in FIGS. 4 through 6, the tape cassette pushing out mechanism 60 includes a sliding plate 61, a rotating lever 62, a link 63, a rotating lever 64, a pushing lever 65, an auxiliary lever 66, a tape cassette pushing out plate 67, the one-way cam 70, the twisted coil spring 68, and a twisted coil spring 69.

The sliding plate 61 is slidably attached to the sliding cam 41 in the Y2 direction via slits 61a and 61b. A tip pin 51a of the rotating arm 51 is engaged in an X direction groove 61X of the sliding plate 61. The rotating arm 51 is supported by a fixed shaft 27 on the chassis 21, and a pin 51b of the rotating arm 51 is engaged in a snail groove 25a of the disk cam 25. The twisted coil spring 68 is disposed between the sliding cam 41 and the sliding plate 61. The sliding plate 61 is positioned by being strongly pushed in the Y1 direction by the twisted coil spring 68, and the sliding cam 41 is moved together with the sliding plate 61 in the Y2 direction as an integrated unit.

The rotating lever 62 is supported by a shaft 62a fixed to the sliding cam 41, and arm lengths L1 and L2 of the rotating lever 62 have a relation L1<L2. An X1 direction end of the rotating lever 62 is connected to the sliding plate 61.

The rotating lever 64 is supported by a shaft 64a fixed to the sliding cam 41, and arm lengths L3 and L4 of the rotating lever 64 have a relation L3<L4.

An X2 direction end of the rotating lever 62 and an X1 direction end of the rotating lever 64 are connected by the link 63.

The pushing lever 65 has a hook 65a being a stopping section at its one end. The auxiliary lever 66 has a guide pin 66a at its one end. The pushing lever 65 and the auxiliary lever 66 dispose the twisted coil spring 69 between them and are supported by an X2 side end pin 64b of the rotating lever 64. The twisted coil spring 69 applies a force so that the pushing lever 65 and the auxiliary lever 66 are positioned in a straight line. However, the pushing lever 65 and the auxiliary lever 66 are positioned in a bent line protruding to the X1 side caused by hitting a protrusion of the auxiliary lever 66 on an end of the pushing lever 65. In addition, the pushing lever 65 can be further rotated in the clockwise direction for the auxiliary lever 66 by deflecting the twisted coil spring 69.

A pushing lever assembled body 65A being a stopping member is composed of the pushing lever 65, the auxiliary lever 66, and the twisted-coil spring 69.

The tape cassette pushing out plate 67 is slidably attached to the sliding cam 41 in the Y2 direction by slits 67a and 67b. The tape cassette pushing out plate 67 includes a bent part 67c at its Y1 direction end and a tape cassette pushing out part 67d at its Y2 direction end. The tape cassette pushing out part 67d faces the tape cassette housing 30 at the ejecting position. The hook 65a stops the bent part 67c.

The tape cassette pushing out part 67d is positioned at one of three positions for the sliding cam 41, that is, positions $Q_0$, $Q_1$, and $Q_2$ from the Y1 side. The position $Q_0$ is the position shown in FIGS. 3(A1) and (B1). The position $Q_1$ is the position shown in FIGS. 3(A2) and (B2). The position $Q_2$ is the position shown in FIGS. 3(A3) and (B3).

The tape cassette pushing out part 67d is moved from $Q_0$ to $Q_1$ corresponding to an operation of the sliding cam locking mechanism 80 (described below). The tape cassette pushing out part 67d is moved from $Q_1$ to $Q_2$ by the excessive rotation of the rotating arm 51, and at this time, the tape cassette long length ejection is executed. The tape cassette pushing out part 67d is moved from $Q_2$ to $Q_1$ by the return rotation of the rotating arm 51. The tape cassette pushing out part 67d is moved from $Q_1$ to $Q_0$ by a manual operation of a user who deeply inserts the tape cassette 10 into the tape cassette housing 30 staying at the ejecting position.

As shown in FIGS. 6 and 7, the one-way cam 70 includes a cam groove 71 that guides the guide pin 66a. The cam groove 71 includes an initial position cam groove part 72, a first side cam groove part 73, a second side cam groove part 74, and a third side cam groove part 75. The first, second, and third side cam groove parts 73, 74, and 75 form an approximate triangle, the first and second side cam groove parts 73 and 74 form a crest whose peak is in the X2 direction, the third side cam groove part 75 is elongated in the Y direction, and the initial position cam groove part 72 is positioned at the Y1 direction end of the third side cam groove part 75. A step part 76 is formed between the initial position cam groove part 72 and the third side cam groove part 75, and the guide pin 66a positioned at the initial position cam groove part 72 is prevented from being moved to the third side cam groove part 75 by the step part 76, and is surely moved to the first side cam groove part 73.

As shown in FIGS. 5 and 8, the sliding cam locking mechanism 80 is provided in relation to the tape cassette pushing out plate 67. The sliding cam locking mechanism 80 restricts the sliding cam 41 from sliding by locking the sliding cam 41 to the chassis 21, and includes an intermediate lever 81 and a locking lever 82. The intermediate lever 81 is rotatably supported by a pin 81a on the sliding cam 41, and a slit 81b at the X1 direction end is engaged by a pin 67e on the tape cassette pushing out plate 67. The locking lever 82 is rotatably supported by a pin 82a on the sliding cam 41, a force is applied to the locking lever 82 in the clockwise direction by a spring 83, and the locking lever 82 includes a locking pawl 82b on its Y1 side end. When one of the intermediate lever 81 and the locking lever 82 is rotated, the other of them is rotated together with the one. By the locking operation of the sliding cam locking mechanism 80, the tape cassette pushing out plate 67 is moved from $Q_0$ to $Q_1$ in the Y2 direction.

5 [Operations of Tape Cassette Pushing Out Mechanism 60]

(1) Operations at the time when the tape cassette streamer 20 is changed from the state shown in FIGS. 3(A1) and (B1) to the state shown in FIGS. 3(A2) and (B2)

Figure 10:
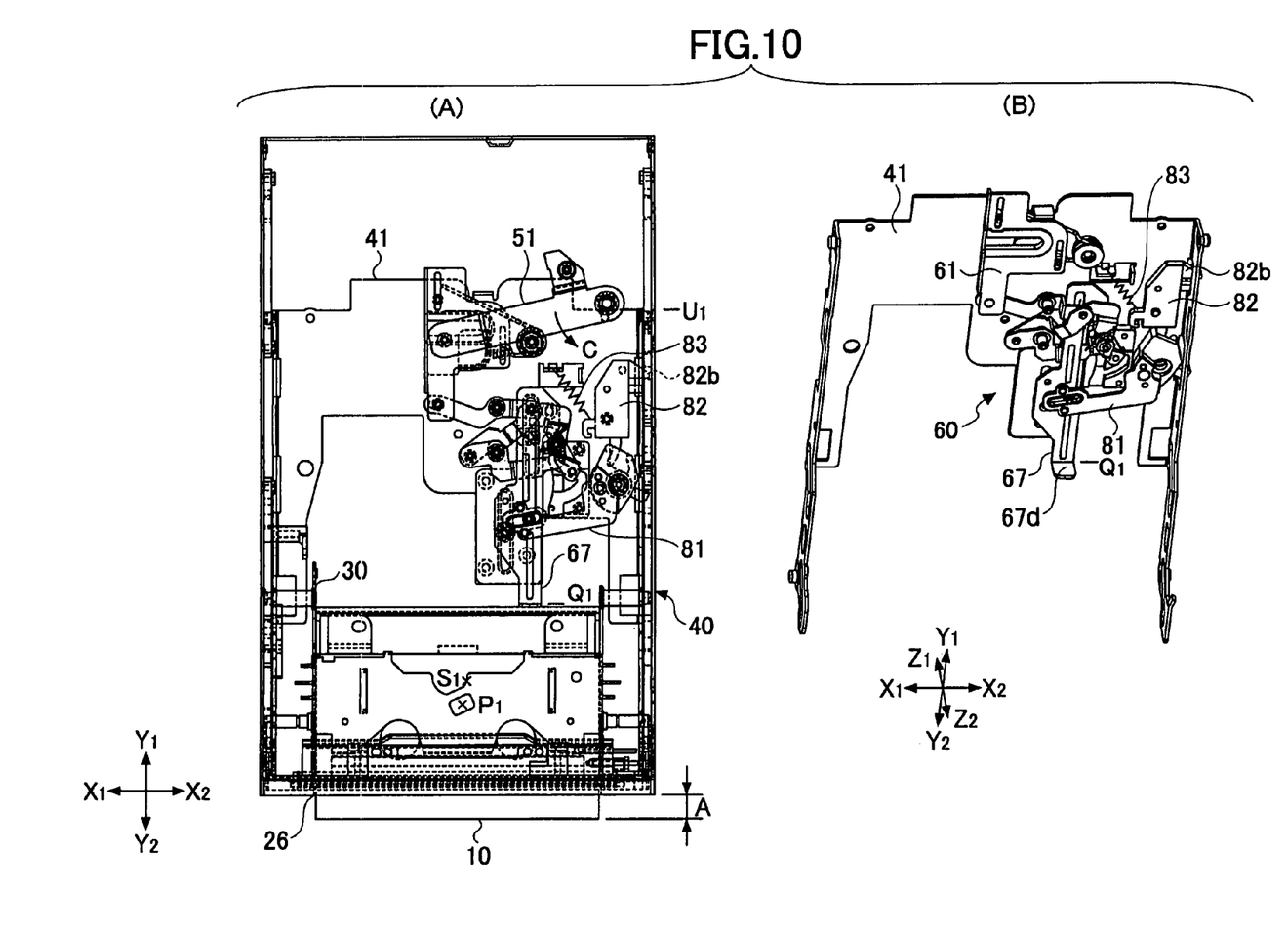
FIG. 10 is a diagram showing a state when a tape cassette is ejected by the tape cassette pushing out mechanism.

When the tape cassette streamer 20 is changed from the state shown in FIGS. 3(A1) and (B1) to the state shown in FIGS. 3(A2) and (B2), the tape cassette pushing out mechanism 60 is changed to the position shown in FIGS. 10(A) and (B) (the tape cassette pushing out part 67d of the tape cassette pushing out plate 67 is positioned at $Q_1$ as shown in FIG. 9) from the position shown in FIGS. 4 and 5 (the tape cassette pushing out part 67d of the tape cassette pushing out plate 67 is positioned at $Q_0$).

By an ejecting instruction, the motor 24 is driven and the disk cam 25 is rotated, the rotating arm 51 is rotated in the C direction by the snail groove 15a of the disk cam 25, the sliding cam 41 is moved in the Y2 direction to the position $U_1$ shown in FIG. 10(A) with the sliding plate 61, the cassette housing 30 is moved to the ejecting position $S_1$, the tape cassette 10 is moved to position $P_1$, and the rear part of the cassette tape 10 is protruded by the distance A (approximately 6 mm) from the inserting opening 26.

The sliding plate 61 is moved without changing the position for the sliding cam 41, and the tape cassette pushing out mechanism 60 is moved by maintaining the position shown in FIGS. 4 and 5. When the sliding cam 41 reaches the position $U_1$, as shown in FIGS. 10(A) and (B), the intermediate lever 81 faces the concave section of the chassis 21, the locking lever 82 is rotated in the clockwise direction, the intermediate lever 81 is rotated in the counter-clockwise direction by the spring 83, the locking pawl 82b is engaged to a part of the chassis 21, and the sliding plate 61 is locked at the position $U_1$. At the same time, the tape cassette pushing out plate 67 is slid in the Y2 direction by the counter-clockwise movement of the intermediate lever 81, and the tape cassette pushing out part 67d is moved to $Q_1$.

(2) Operations at the time when the tape cassette streamer 20 is changed from the state shown in FIGS. 3(A2) and (B2) to the state shown in FIGS. 3(A3) and (B3)

Figure 11:
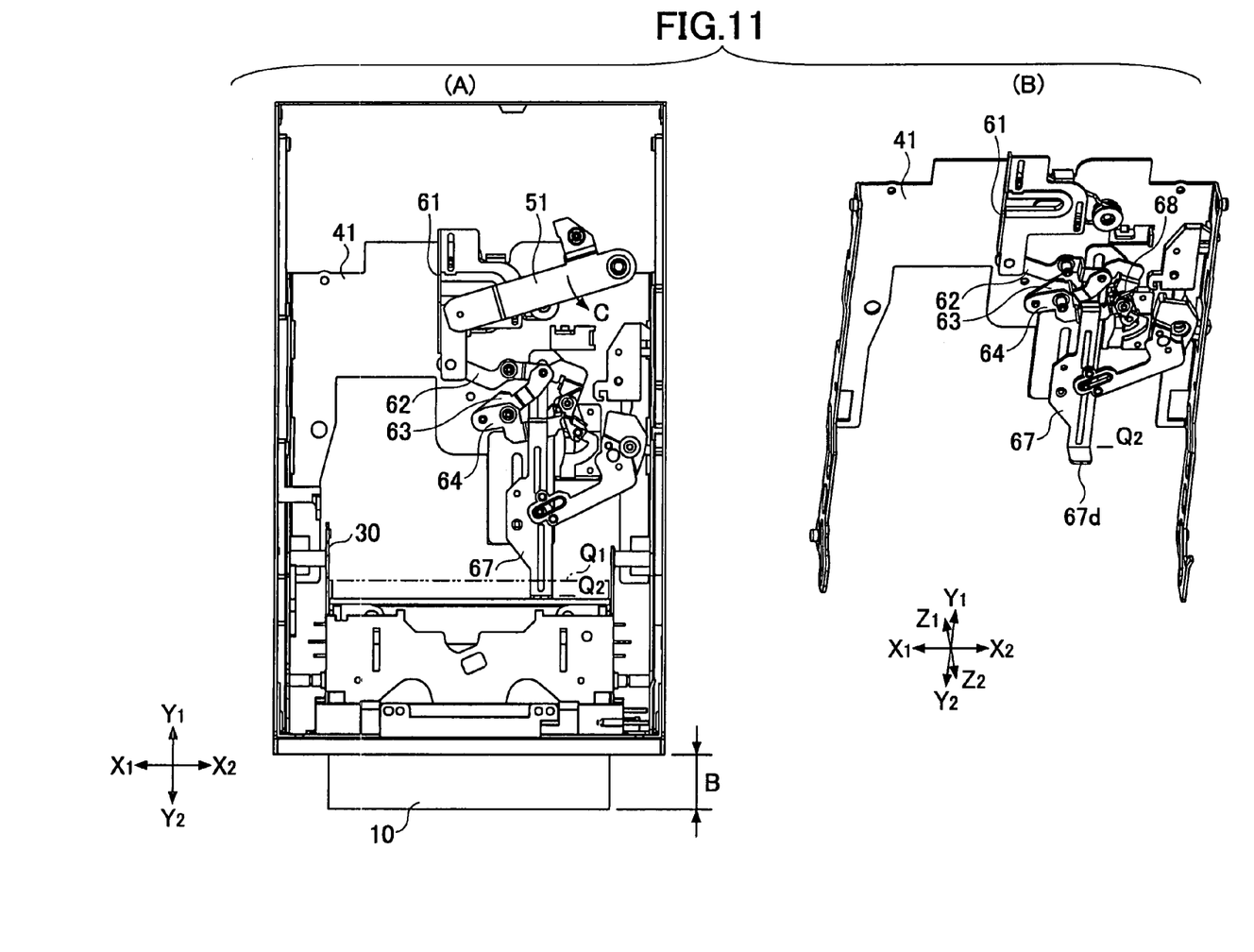
FIG. 11 is a diagram showing a state when a tape cassette long length ejection is executed by operations of the tape cassette pushing out mechanism.

FIG. 11 is a diagram showing a state in which the tape cassette long length ejection is executed by operations of the tape cassette pushing out mechanism 60. That is, FIG. 11 shows the tape cassette pushing out mechanism 60 at the time when the rotating arm 51 is excessively rotated. FIG. 9(B) shows the tape cassette pushing out mechanism 60 in a linkage diagram at the time of FIGS. 11(A) and (B). FIG. 9(A) shows the tape cassette pushing out plate 67 in a linkage diagram at the position $Q_0$.

The disk cam 25 is further rotated to the end position by the motor 24; after this, the disk cam 25 is stopped by being slightly returned with an inverse rotation of the motor 24. The rotating arm 51 is excessively rotated in the counter-clockwise direction, by deflecting the twisted coil spring 68, from the position shown in FIG. 10(A), and after this, is slightly rotated in the clockwise direction with an inverse rotation of the motor 24.

When the rotating arm 51 is excessively rotated in the C direction, as shown in FIGS. 9(B), the sliding plate 61 is slid in the Y2 direction by a distance V1, the rotating lever 62 is rotated in the counter-clockwise direction, the rotating lever 64 is rotated in the clockwise direction via the link 63, the hook 65a of the pushing lever assembled body 65A stops the bent part 67c and pushes in the Y2 direction (FIG. 6). With this, the tape cassette pushing out plate 67 is moved in the Y2 direction, and the tape cassette pushing out mechanism 60 reaches the position shown in FIGS. 11(A) and (B). The tape cassette pushing out part 67d pushes the tape cassette 10 in the Y2 direction from the tape cassette housing 30, so that the rear part of the tape cassette 10 is protruded by the distance B (approximately, 14 mm) from the inserting opening 26. With this, the tape cassette long length ejection is finished.

As mentioned above, the tape cassette long length ejection is stably executed by the movement corresponding to an excessively rotating speed of the rotating arm 51 in the C direction without influence of temperature and dropping of the tape cassette 10 from the inserting opening 26.

After this, the motor 24 is inversely rotated, and the rotating arm 51 is returned by the excessive rotation by being rotated in the CC direction. In this, the sliding cam 41 stays at the position $U_1$, and the tape cassette housing 30 stays at the position $S_1$.

As mentioned above, in the arm lengths L1 and L2 of the rotating lever 62 and the arm lengths L3 and L4 of the rotating lever 64, there are relations L1<L2 and L3<L4. Therefore, the moving distance V1 of the sliding plate 61 in the Y2 direction is amplified and the moving distance V2 of the pushing lever assembled body 65A in the Y2 direction becomes greater than the moving distance V1 of the sliding plate 61 in the Y2 direction, that is, V1<V2. Consequently, even when the excessive rotating angle of the rotating arm 51 is small, the tape cassette 10 can be made to protrude by the distance B (approximately, 14 mm) from the inserting opening 26.

Next, operations of the pushing lever assembled body 65A are explained by referring to FIGS. 12(A) through (D).

Figure 12:
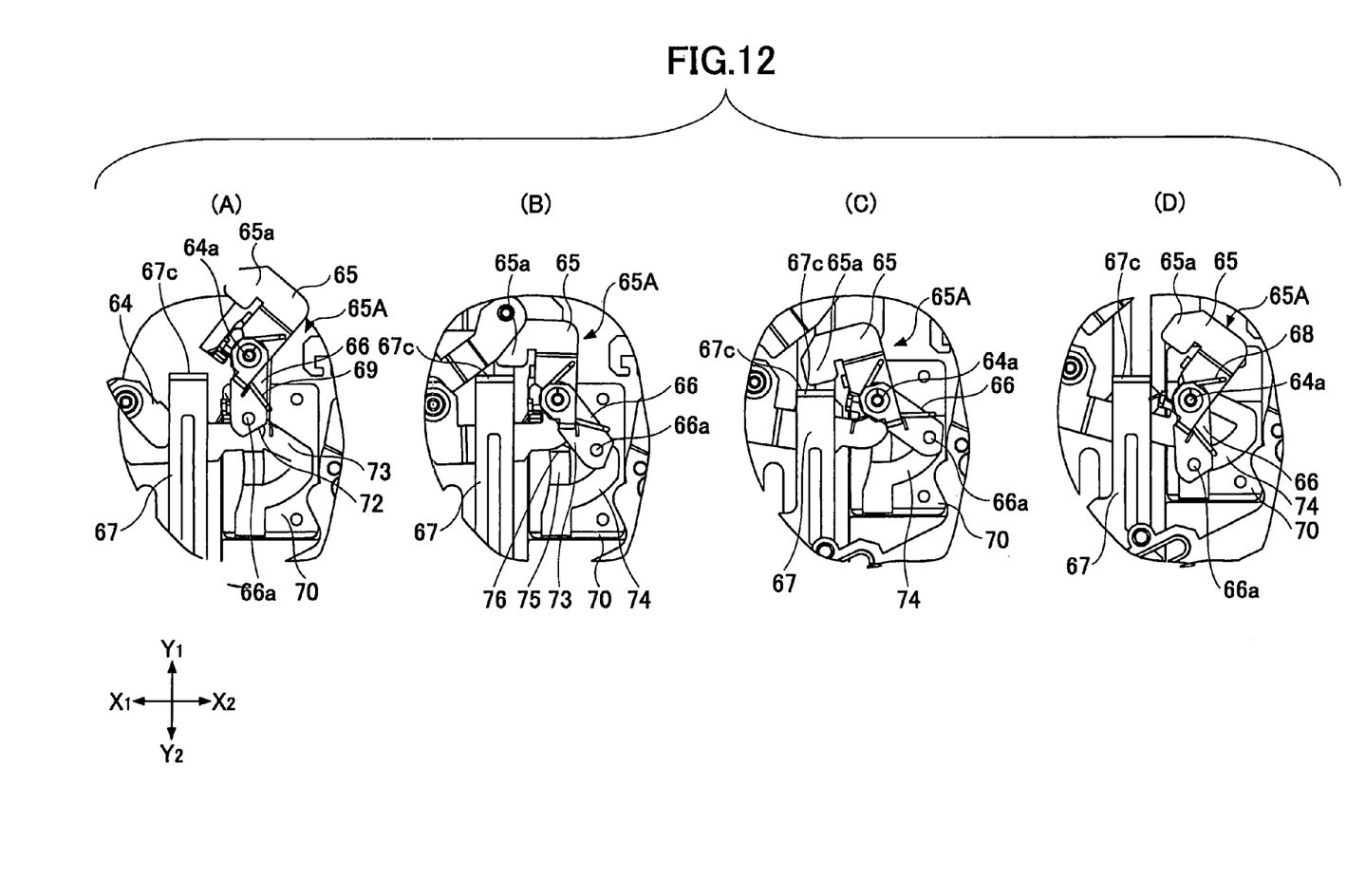
FIG. 12 is a diagram showing operations of a pushing lever assembled body at the time when the tape cassette pushing out mechanism is operated.

Before starting the excessive rotation of the rotating arm 51 (refer to FIG. 6), the pushing lever assembled body 65A is positioned as shown in FIG. 12(A). The guide pin 66a is positioned in the initial position cam groove part 72. The pushing lever 65 faces in the middle direction between the Y2 and X2 directions. The hook 65a is positioned at the X2 side of the bent part 67c. When the rotating arm 51 is started to rotate excessively and the rotating lever 64 is rotated in the clockwise direction, the guide pin 66a enters the first side cam groove part 73 by being guided with the step part 76. Further, the pushing lever assembled body 65A is rotated in the counter-clockwise direction (FIGS. 12(B) and (C)) by being guided by the first side cam groove part 73, so that the hook 65a faces the bent part 67c and further is moved in the Y2 direction, and then the hook 65a stops and pushes the bent part 67c in the Y2 direction. With this, the tape cassette pushing plate 67 is moved in the Y2 direction. The guide pin 66a is further moved along the second side cam groove part 74, and the pushing lever assembled body 65A is rotated in the clockwise direction as shown in FIG. 12 (D).

When the rotating arm 51 is rotated in the CC direction by the excessive rotation, the guide pin 66a is guided along the third side cam groove part 75, and reaches the initial position cam groove part 72; the pushing lever assembled body 65A is returned to the initial position shown in FIG. 12(A). The hook 65a is positioned at the X2 side of the bent part 67c and does not obstructs sliding the tape cassette pushing out plate 67 in the Y1 direction.

(3) Operations when the tape cassette 10 is inserted into the tape cassette housing 30

In the tape cassette streamer 20 in the state shown in FIG. 11(A), the tape cassette pushing out plate 67 can slide in the Y1 direction. Therefore, when the tape cassette 10 is inserted into the tape cassette housing 30, as shown by a two-dot chain line, the tape cassette 10 is inserted into the end position in the tape cassette housing 30 by pushing the tape cassette pushing out plate 67 in the Y1 direction.

When the tape cassette 10 is inserted into the end position in the tape cassette housing 30, a sensor detects the insertion and the motor 24 is driven, the rotating arm 51 is rotated in the CC direction, the sliding plate 61 is slid in the Y1 direction, the tape cassette housing 30 is moved and the tape cassette 10 is loaded. The tape cassette streamer 20 becomes the state shown in FIGS. 3(A1) and (B1), and FIG. 4.

Figure 13:
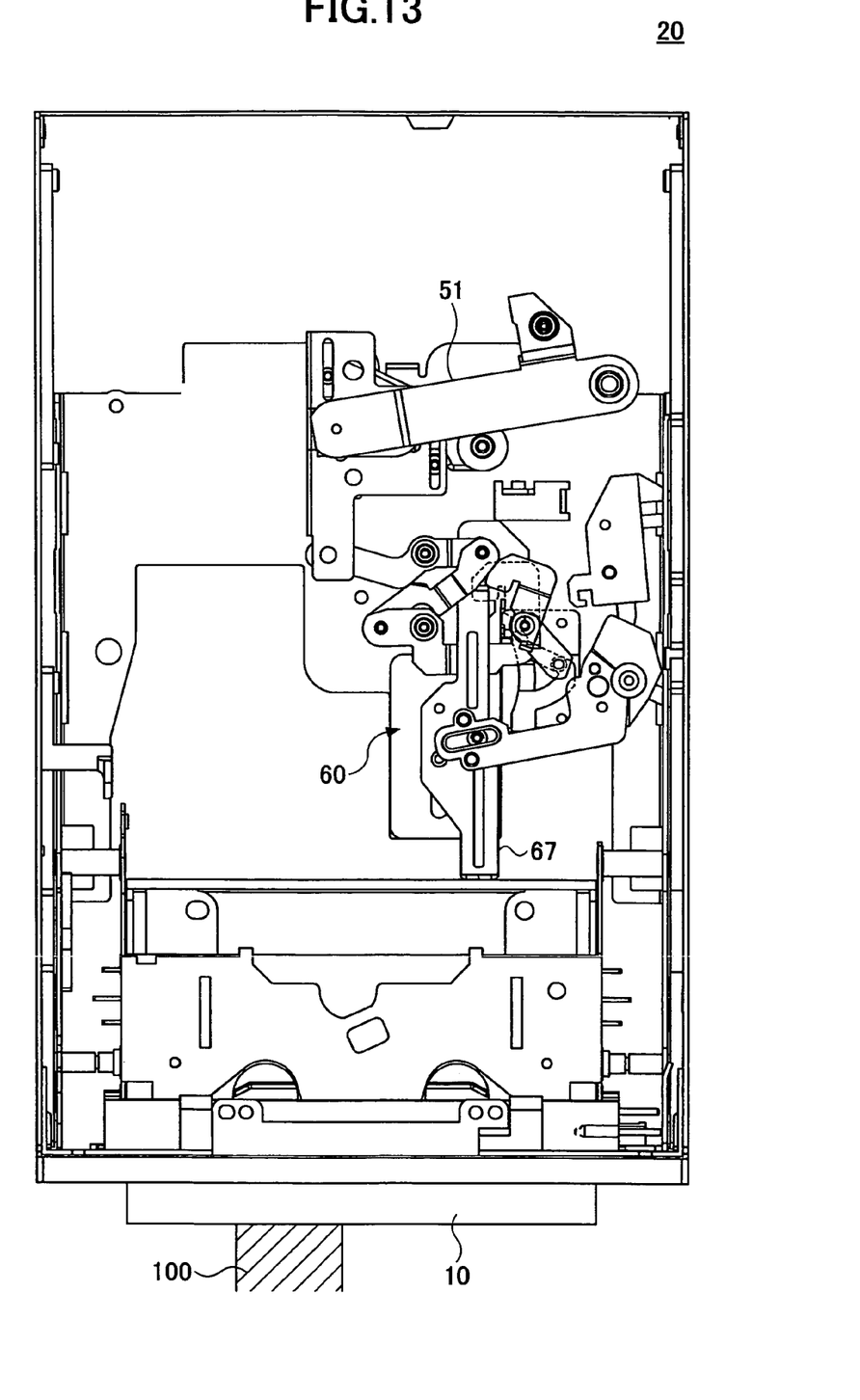
FIG. 13 is a diagram showing a state when pushing out of the tape cassette is stopped during the tape cassette ejecting operation.
Figure 14:
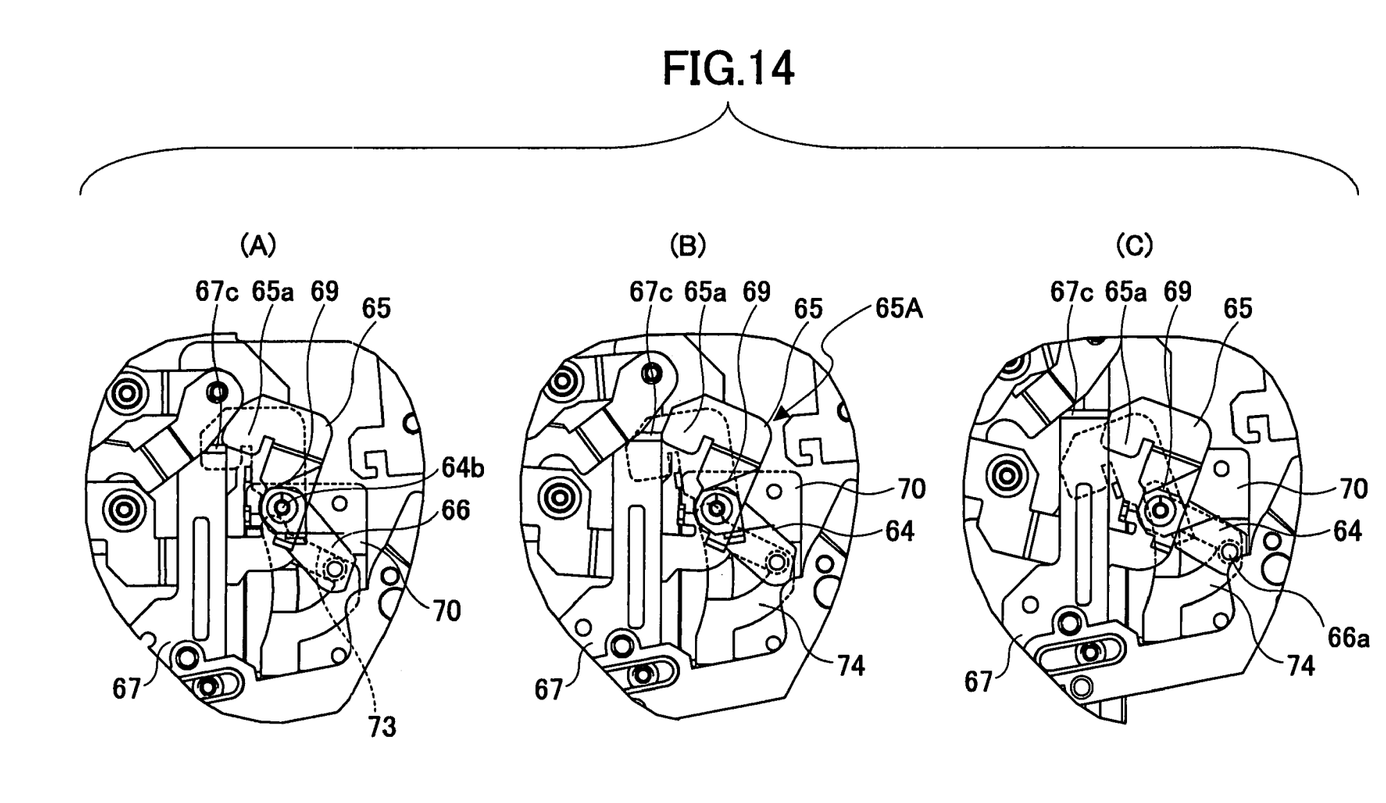
FIG. 14 is a diagram showing operations of the pushing lever assembled body when pushing out of the tape cassette is stopped during the tape cassette ejecting operation.

(4) Operations in a case where the tape cassette 10 cannot be ejected due to hitting an obstacle 100 during the tape cassette long length ejection As shown in FIG. 13, when the tape cassette 10 hits the obstacle 100 during the tape cassette long length ejection, the tape cassette pushing out plate 67 cannot be further slid in the Y2 direction, and the pushing lever 65 of the pushing lever assembled body 65A is rotated in the clockwise direction from the auxiliary lever 66 by deflecting the twisted coil spring 69 as shown in FIGS. 14(A), (B), and (C). The pushing lever assembled body 65A is further bent, and the hook 65a gets over the bent part 67c in the Y2 direction.

The guide pin 66a is guided by the second side cam groove part 74. Therefore, the pushing lever assembled body 65A is rotated in the clockwise direction as shown in FIG. 12(D). After this, the guide pin 66a is guided along the third side cam groove part 75 and reaches the initial position cam groove part 72, so that the pushing lever assembled body 65A is returned to the initial position shown in FIG. 12(A).

Therefore, the tape cassette pushing out mechanism 60 is not damaged and does not have an excessive load.

The present invention can be applied to a recording/reproducing apparatus using a cassette tape other than a tape cassette streamer.

Further, the present invention is not limited to the embodiment, but variations and modifications may be made without departing from the scope of the present invention.

The present application is based on Japanese Priority Application No. 2005-061526 filed on Mar. 4, 2005, with the Japanese Patent Office, the entire contents of which are hereby incorporated by reference.

What is claimed is:

1. A tape cassette recording/reproducing apparatus, comprising:
   a tape cassette holder that holds an inserted tape cassette;
   a tape cassette holder moving mechanism that moves the tape cassette holder in which the tape cassette is inserted between a tape cassette loading position and a tape cassette ejecting position; and
   a tape cassette pushing out mechanism that further pushes out the tape cassette by a predetermined distance from the tape cassette holder positioned at the tape cassette ejecting position; wherein
   the tape cassette holder moving mechanism comprises a motor, an arm which is rotated by the motor, and a sliding cam which is moved by a rotation of the arm, and the tape cassette holder is moved from the tape cassette loading position to the tape cassette ejecting position by a movement of the sliding cam to a predetermined position, and
   the arm is excessively moved after the sliding cam is moved to the predetermined position, and
   the tape cassette pushing out mechanism is disposed on the sliding cam and is moved by the excessive rotation of the arm; and wherein
   the tape cassette pushing out mechanism comprises;
   a tape cassette pushing out member that is slidably attached in the pushing out direction of the tape cassette from the tape cassette holder to the sliding cam:
   a stopping member that stops the tape cassette pushing out member; and
   a link mechanism, which is disposed between the arm and the stopping member, moves the stopping member in the same direction as the sliding direction of the tape cassette pushing out member by the excessive rotation of the arm; wherein
   the stopping member is moved by stopping the tape cassette pushing out member via the link mechanism by the excessive rotation of the arm, and the tape cassette pushing out member slides in the pushing out direction of the tape cassette from the tape cassette holder.

2. The tape cassette recording/reproducing apparatus as claimed in claim 1,
   wherein the link mechanism amplifies so that the moving distance of the stopping member is greater than the moving distance of the tip of the arm due to the excessive rotation of the arm.

3. The tape cassette recording/reproducing apparatus as claimed in claim 1,
   wherein the stopping member comprises a stopping section that stops the tape cassette pushing out member, in a case where a load being applied to the stopping section becomes greater than a predetermined value at the time when the stopping section slides the tape cassette pushing out member, and the stopping section is separated from the tape cassette pushing out member by rotating the stopping section in the separating direction against a force of a spring.

* * * * *